(12) United States Patent
Way

(10) Patent No.: US 8,811,428 B2
(45) Date of Patent: Aug. 19, 2014

(54) DOCSIS UPSTREAM BURST EFFICIENCY MAXIMIZATION AND SUPPORT FOR JUMBO FRAMES

(75) Inventor: Richard Franklin Way, Berkeley Lake, GA (US)

(73) Assignee: Broadcom Corporation, Irvine, CA (US)

( * ) Notice: Subject to any disclaimer, the term of this patent is extended or adjusted under 35 U.S.C. 154(b) by 37 days.

(21) Appl. No.: 13/482,214

(22) Filed: May 29, 2012

(65) Prior Publication Data

US 2013/0322465 A1   Dec. 5, 2013

(51) Int. Cl.
*H04J 3/16* (2006.01)

(52) U.S. Cl.
USPC ............................................ 370/469; 370/474

(58) Field of Classification Search
USPC ................................................ 370/474, 469
See application file for complete search history.

(56) References Cited

U.S. PATENT DOCUMENTS

| | | | |
|---|---|---|---|
| 2005/0135284 A1* | 6/2005 | Nanda et al. | 370/294 |
| 2006/0239298 A1* | 10/2006 | Townsley et al. | 370/470 |
| 2007/0195817 A1* | 8/2007 | Denney et al. | 370/468 |
| 2008/0159140 A1* | 7/2008 | Robinson et al. | 370/232 |

OTHER PUBLICATIONS

European Search Report dated Jan. 31, 2013.

* cited by examiner

*Primary Examiner* — Sai-Ming Chan
(74) *Attorney, Agent, or Firm* — Sterne, Kessler, Goldstein & Fox P.L.L.C.

(57) ABSTRACT

A method for passing ingress and egress jumbo frames and maximizing the use of frame bursts in a cable modem including, receiving from a client device one or more packets to be transmitted over a communication channel, queuing the one or more packets, determining a maximum size of a burst frame transmitted over the communication channel, adding each of the one or more packets in their entirety to the burst frame until the maximum size of the burst frame is reached, determining whether the burst frame has available space, when space is available, fragmenting a packet of the one or more packets into at least a first and a second fragment packet, wherein the first fragment packet has a size substantially equal to the available space of burst frame, and adding the first fragment packet to the burst frame and transmitting the burst frame during a transmit window.

20 Claims, 4 Drawing Sheets

DOCSIS UPSTREAM BURST EFFICIENCY MAXIMIZATION AND SUPPORT FOR JUMBO FRAMES

BACKGROUND OF THE INVENTION

1. Field of the Invention

The invention relates generally to burst-based upstream communication.

2. Related Art

Cable television (CATV) systems are no longer limited to only providing television programs to viewers. In addition, they provide internet access, among other services, to consumers via signals transmitted to customer premises by optical fibers, coaxial and other cables and local radio channels, such as Wi-Fi, Bluetooth®, etc., all in contrast to traditional over-the-air radio wave broadcasting of television programming.

A CATV system may utilize Data Over Cable Service Interface Specification (DOCSIS) compliant equipment and protocols to carry out a transfer of information, such as video, audio, and/or data between one or more devices and one or more cable modem termination systems (CMTS). One typical device in communication with a CMTS is a cable modem. A cable modem is often located on a customer's premises and configured to transmit and receive Internet communications with the CMTS. In a common configuration, however, many cable modems share the same communication medium. As a result, they communicate with the CMTS in data bursts. These data bursts, however, do not always make use of the maximum amount of data that may be transmitted over the communication channel in a single burst. Accordingly, what is needed are improved methods and systems for maximizing the use of upstream data bursts and support for jumbo frames in both directions.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE INVENTION

Figure 1:
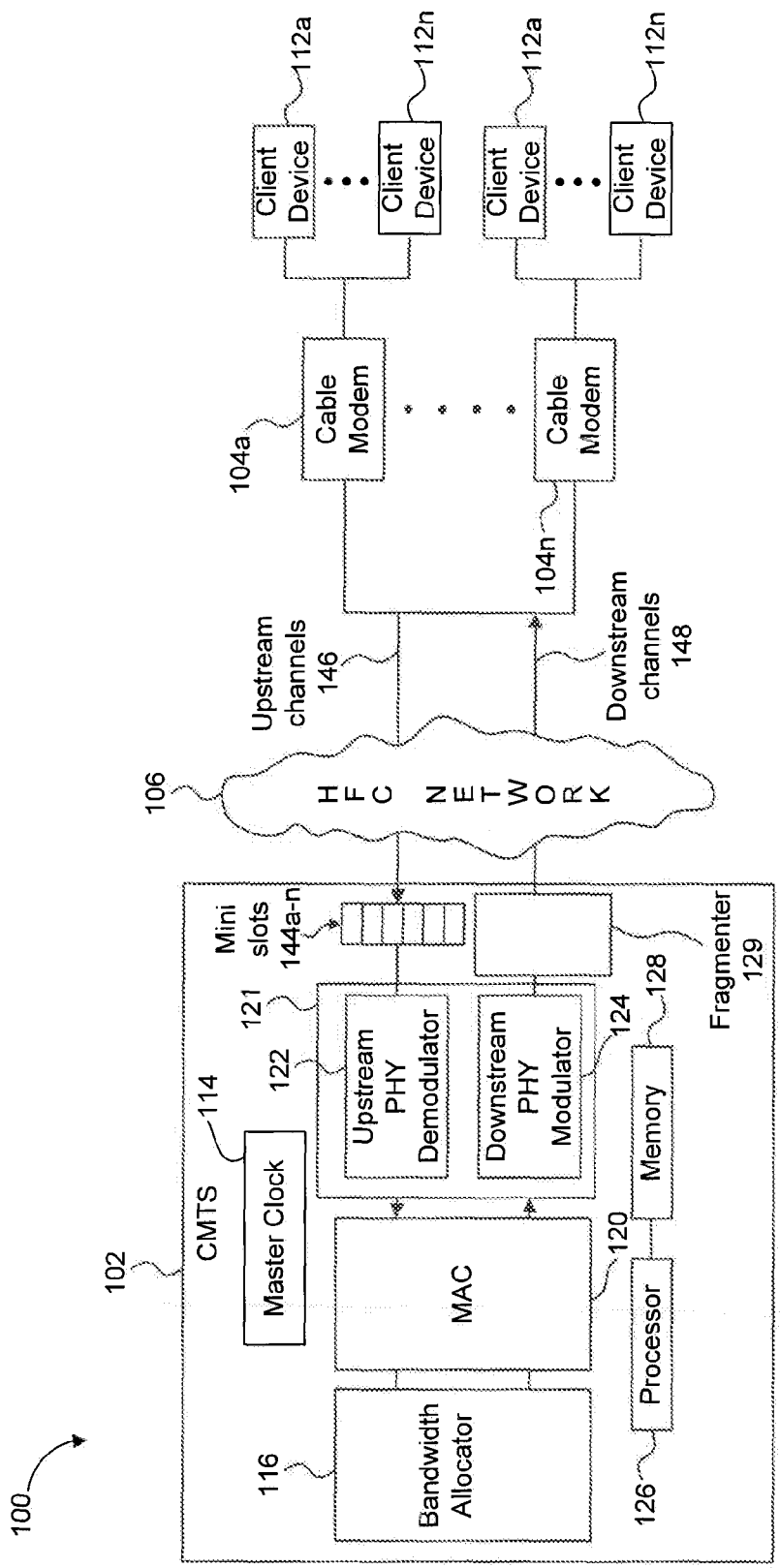
FIG. 1 illustrates an example DOCSIS environment 100, according to an embodiment.

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

An Exemplary DOCSIS Environment

FIG. 1 illustrates an example DOCSIS environment 100, according to an embodiment. DOCSIS environment 100 includes a cable modem termination system (CMTS) 102 coupled to one or more cable modems (CMs) 104a-n via a HFC network 106. Each cable modem 104 may be coupled to one or more client devices 112a-n. In embodiments presented herein, "n" is an arbitrary positive integer.

CMTS 102 may include a media access controller (MAC) 120, and a physical layer (PHY) 121 that includes a downstream physical layer modulator (DS PHY) 124 and an upstream physical layer demodulator (US PHY) 122. CMTS 102 may also include a master clock 114 and a bandwidth allocator 116. In an embodiment, CMTS 102 may include a processor 126 coupled to a memory 128. The functions described herein as being performed by CMTS 102 may be performed by processor 126 based on instructions stored in memory 128. CMTS 102 is coupled to HFC network 106, which provides interconnectivity between CMTS 102 and cable modems 104. HFC network 106 supports wired, wireless, or both transmission media, including satellite, terrestrial (e.g., fiber optic, copper, twisted pair, coaxial, or the like), radio, microwave, free-space optics, and/or any other form or method of transmission. HFC network 106 may be any type of network including, but not limited to, the Internet or another wide area network (WAN). In an embodiment, HFC network 106 is part of a DOCSIS network. It is to be appreciated that the type of network 106 is a design choice and may be arbitrary.

PHY 121 includes US PHY 122 and DS PHY 124. US PHY 122 forms the physical layer interface between CMTS 102 and the upstream channels of HFC network 106. CMTS 102 may include a separate US PHY 122 for each one of its upstream channels. US PHY 122 receives and demodulates all bursts from cable modems 104.

DS PHY 124 forms the physical layer interface between CMTS 102 and the downstream channel(s) of HFC network 106. Hence, video, voice, data and/or control messages that are destined for one or more cable modems 104 are collected at DS PHY 124 and transmitted to the respective cable modems 104. DS PHY 124 modulates and/or formats the information for downstream transmission.

MAC 120 receives the upstream signals from US PHY 122 and provides the downstream signals to DS PHY 124, as appropriate. MAC 120 operates as the lower sublayer of the data link layer of CMTS 102. In embodiments, MAC 120 may support fragmentation, concatenation, payload header suppression/expansion, and/or error checking for signals transported over the physical layer using DOCSIS.

Memory 128 may interact with MAC 120 to store the signals as they are processed by MAC 120. Memory 128 may also store various auxiliary data used to support the processing activities. Such auxiliary data includes security protocols, identifiers, rules, policies etc.

HFC network 106 comprises upstream channels 146 and downstream channels 148. Upstream channels 146 may be one or more channels dedicated to communicating data from cable modems 104 to CMTS 102. Downstream channels 148 may be one or more channels dedicated to communicating data from CMTS 102 to cable modems 104. Each of the cable modems 104 may begin transmitting over upstream channels 146 at any time. In particular, CMTS 102 and cable modems 104 may use mini-slots 144a-n to control the transmission of data over upstream channels 146. Mini-slots 144a-n may control the timing of data bursts from cable modems 104. Each of the mini-slots 144 may correspond to a time period that each of the cable modems 104 may transmit within. The amount of time assigned to each mini-slot is often done using a mechanism referred to as ticks. Each tick represents a preset time, typically in microseconds, such as 6.25 microseconds. For example, in a common configuration, each of the mini-slots 144a-n may be assigned two ticks. However, the period of time that min-islots 144a-n are configured for may be different depending on the configuration of CMTS 102.

In order to receive a slot assignment within mini-slots 144, cable modems 104 may request one or more mini-slots from CMTS 102. After receiving the requests from cable modems 104, CMTS 102 may grant those requests. However, in some cases CMTS 102 may assign a lower number of mini-slots than requested or none at all, depending on the availability of mini-slots 144.

The period of time that mini-slots 144a-n are configured for correlates to the number of burst opportunities for cable modems 104. However, there may be added delays such as a lead-time delay and a downstream interleaver that decrease the number of burst opportunities. For example, a common lead-time delay is two milliseconds, and the downstream interleaver delay may be 0.15 milliseconds. Accordingly, in such a case, cable modems 104 may only be able to transmit every 4.15 milliseconds, if mini-slots 144 are two milliseconds in total (2 milliseconds+2 milliseconds (lead-time delay)+0.15 (downstream interleaver delay)).

The amount of data that may be transmitted in a burst may depend on a number of factors. First, the modulation scheme used, and the time/ticks assigned to each mini-slot /imposes limits on the burst size. For example, using 64QAM modulation with two ticks per mini-slot, the theoretical maximum burst size is approximately 11,315 bytes. However, this may be further limited at CMTS 102. For example, CMTS 102 may provide configuration settings that limit the burst size, such as 4096 bytes. Similarly, cable modems 104 may further limit the burst size. For example, the particular hardware of cable modems 104 may impose limits on the size of the burst. Cable modems 104 may also have configuration settings that limit the size of the burst frame. For example, cable modems 104 may be configured to limit the size of the burst frame to 2048 bytes. Accordingly, the maximum size of the burst frame is the lower of the theoretical maximum size of the channel, limits set at CMTS 102, and limits at cable modems 104. For example, if the theoretical maximum for upstream channels 146 is 11,315 bytes, CMTS 102 is configured for a limit of 4096 bytes, and cable modems 104 are configured for 2048 bytes, then the maximum burst size is 2048 bytes.

DOCSIS environment 100 may also be configured for concatenated burst. Concatenated burst is a feature of DOCSIS that allows for packets to be queued at cable modems 104 and sent in the same burst frame. However, the number of packets that can be concatenated in the same frame is limited by the maximum frame burst size. There may also be hardware limitations in cable modems 104 that limit the size of the frame burst. For example, cable modems 104 may not have enough memory or processing power to concatenate frames over a particular number of bytes or a particular number of frames.

An Exemplary Concatenated Burst Environment

Figure 2:
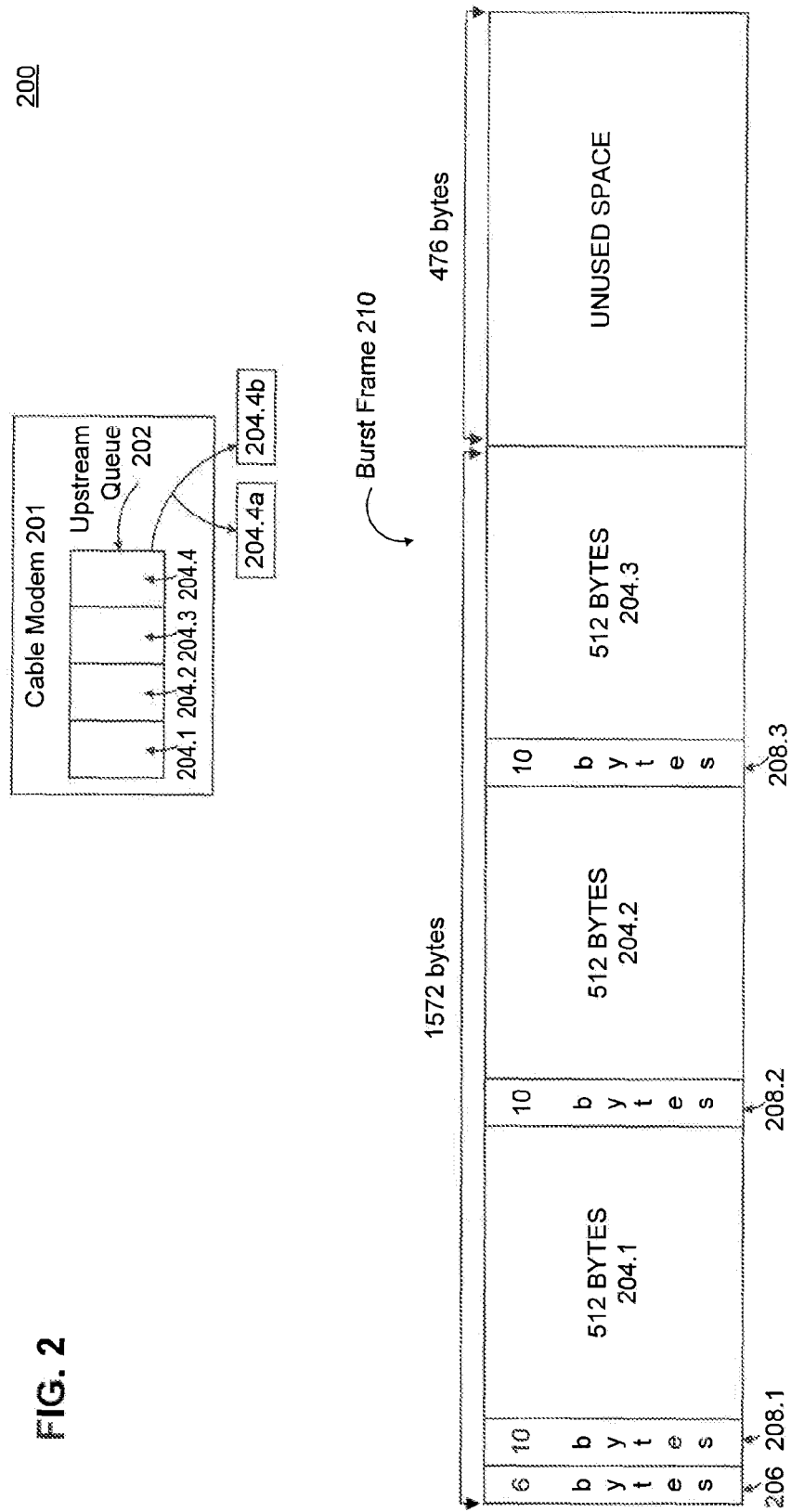
FIG. 2 is a diagram of a concatenated burst environment 200, according to an exemplary embodiment.

FIG. 2 is a diagram of a concatenated burst environment 200, according to an exemplary embodiment. Concatenated burst environment 200 includes a cable modem 201 and a burst frame 210. Cable modem 201 may include upstream queue 202. Upstream queue 202 may be a queue for storing packets 204.1-204.4 prior to transmittal. Packets 204.1-204.4 may be Ethernet encapsulated Internet protocol (IP) packets. For example, packets 204.1-204.4 may implement IPv4 or IPv6. While FIG. 2 depicts packets 204.1-204.4, it is to be appreciated, that upstream queue 202 may store any number of packets. For example, if a client device sends a packet to cable modem 201 for transmittal, the packet may be first placed in upstream queue 202 while cable modem 201 awaits its turn to transmit. However, in an embodiment, cable modem 201 may be configured for concatenated burst.

Using concatenated burst, cable modem 201 may combine portions of packets 204.1-204.4 together to be sent in burst frame 210. For example, burst frame 210 may have a maximum size of 2048 bytes. As discussed above, there may be a variety of settings and configurations that affect the maximum size of burst frame 210. Accordingly, a person of skill in the art would appreciate that the maximum size of the burst frame 210 may be of any size. The size of packets 204.1-204.4 may similarly be of any size. For example, packets 204.1-

204.4 may each be of a different size. The size may depend on a number of factors such as the particular protocol, data and/or message contained within packets 204.1-204.4. For example, each of the packets 204.1-204.4 may each be 512 bytes in length. When transmitting packets using DOCSIS, there may also be some overhead data that is transmitted in order for each of the packets 204.1-204.4 to be properly decoded and processed when they reach the CMTS, such as CMTS 102. In particular, MAC extended headers 208.1-208.4 may be attached respectively to each of the packets 204.1-204.4. MAC extended headers 208.1-208.4 may contain additional data related to the transmission of Ethernet packets in DOCSIS. In an embodiment, MAC extended headers 208.1-208.4 may each be 10 bytes in length. Accordingly, for each packet added to burst frame 210, an additional 10 bytes of data must also be added. This may effectively extend the length of each of the packets 204.1-204.4 by 10 bytes, such that if packets 204.1-204.4 were each originally 512 bytes, they may effectively be 522 bytes when MAC extended headers 208.1-208.4 are appended. Similarly to MAC extended headers 208.1-208.4, burst frame 210 may also include concatenation header 206. Concatenation header 206 may include flags and data related to concatenation within burst frame 210. Concatenation header 206 may permit a CMTS, such as CMTS 102 of FIG. 1 to further process and decode concatenated frames within burst frame 210. In an embodiment, concatenation header 206 may be six bytes in length. A person of skill in the art would appreciate, however, that there may be other overhead transmitted within burst frame 210. For example, the CMTS may be configured for privacy and security using BPI+.

As discussed above, each of the packets 204.1-204.4 may effectively be 522 bytes (when MAC extended headers 208.1-208.4 are accounted for), according to an example. When each of the packets 204.1-204.4 are combined together and concatenation header 206 is added, the total is 2094 bytes, which is larger than the 2048 byte size of the burst frame 210. Accordingly, all of the packets 204.1-204.4 may not fit in their entirety in burst frame 210. At most, only three of the packets, such as 204.1-204.3, may fit in their entirety in burst frame 210. However, if only packets 204.1-204.3 are added to burst frame 210, only 1572 bytes of the 2048 bytes of burst frame 210 may be used (including concatenation header 206). This may result in 476 bytes of unused space in burst frame 210, which is too small to fit packet 204.4.

In an embodiment, cable modem 201 may be configured to make use of this additional space. In particular, cable modem 201 may be configured to fragment a packet at the network protocol layer. For example, if packets 204.1-204.3 are able to fit in burst frame 210, cable modem 201 may fragment packet 204.4. As discussed above, in such a case, burst frame 210, may have 476 bytes of unused space. However, this does not include the MAC extended header 208.4. After accounting for MAC extended header 208.4, this leaves 466 bytes for a portion of packet 204.4. Packet 204.4 may then be split into fragments 204.4a and 204.4b. Fragment 204.4a may contain at most 466 bytes of data, including all of the sub-headers (such as Ethernet, IP, TCP/UDP, HTTP, etc.). Fragment 204.4b may contain the remaining portion of data. Because fragmentation is a function supported by both IPv4 and IPv6 protocols, fragments 204.4a and 204.4b may be transmitted from end-to-end, without out being reassembled during transport. For example, if the destination of packet 204.4 is a web server. Fragments 204.4a and 204.4b may each be transmitted to the web server, where they may then be reassembled into packet 204.4. For example, cable modem 201 may perform the fragmentation independent of the CMTS. In particular, a CMTS may not be aware that fragments 204.4a or 204.4b are fragments. Instead, a CMTS may treat fragments 204.4a and 204.b as typical network encapsulated DOCSIS packets. Accordingly, one advantage of an embodiment of the invention is that cable modem 201 may be compatible with any type of CMTS without the CMTS being made aware of the fragmentation. However, in an embodiment, fragments 204.4a and 204.4b may be reassembled within a CMTS, such as CMTS 102 of FIG. 1. In particular, the CMTS may include a packet reassembler (not shown) that reassembles fragments into packets. If multiple fragments are received from different packets, the packet reassembler may be configured to keep track of each of the fragments, such that they may be properly reassembled into their corresponding packets. For example, the CMTS may copy fragments 204.4a and 204.4b into memory, such as memory 128, and then reassemble the fragments according to the IP protocol rules back into packet 204.4. Accordingly, in such a case, reassembled packet 204.4 may then be transmitted to its intended end destination.

The techniques described above may also be adapted to enable support of jumbo frames. A jumbo frame is an Ethernet frame which is larger than 1518 bytes (when the Ethernet header is accounted for). For example, a jumbo frame may be sent from a client device to cable modem 201. In some cases, the jumbo frame may be larger than the maximum burst size, for example the jumbo frame may be 4096 bytes when the maximum burst frame is 2048 bytes. The DOCSIS specification does not provide support for Ethernet jumbo frames. Accordingly, cable modems and CMTSs are unable to process jumbo frames and when a jumbo frame is sent from a client device, the cable modems or CMTSs may be configured to drop the frame. However, cable modem 201 may provide support for jumbo frames. For example, cable modem 201 may receive jumbo frames from one or more client devices and transmit the data to a CMTS without any modification to the CMTS. In particular, if any of the packets in upstream queue 202 are jumbo Ethernet frames, cable modem 201 may be configured to fragment the jumbo frame packet at the network layer into one or more fragments that are each less than or equal to 1518 bytes in size. For example, cable modem 201 may fragment a jumbo frame using IP protocol rules. If a packet is received by cable modem 201 that is 2000 bytes in size, cable modem 201 may be configured to split the packet into a first fragment of 1518 bytes (including Ethernet and IP layers) and a second fragment of 482 bytes. Accordingly, the packet when received from the client device may be a jumbo frame, however when the packet is sent to the CMTS using DOCSIS, the packet may be fragmented into one or more fragments that are each less than or equal to the standard 1518-byte Ethernet frame size. As a result, the CMTS may decode each of the packets as if they are standard Ethernet frames. Accordingly, depending on the particular version of the IP protocol, the fragments may then be reassembled either along the transmission path or when they reach their intended destination.

The CMTS may also receive jumbo frames from a remote host. For example, a remote host may send a jumbo frame to the CMTS in response to receiving a jumbo frame originating from cable modem 201. However, in some cases, a remote host may also send a jumbo frame to the CMTS without first receiving a jumbo frame. If the CMTS receives a jumbo frame, the CMTS may be configured to fragment the jumbo frame into two or more fragments that are each less than or equal to the 1518-byte Ethernet frame size. Once the fragments are received by cable modem 201, they may then be reassembled using the IP protocol rules.

An Exemplary Cable Modem with Fragmentation

Figure 3:
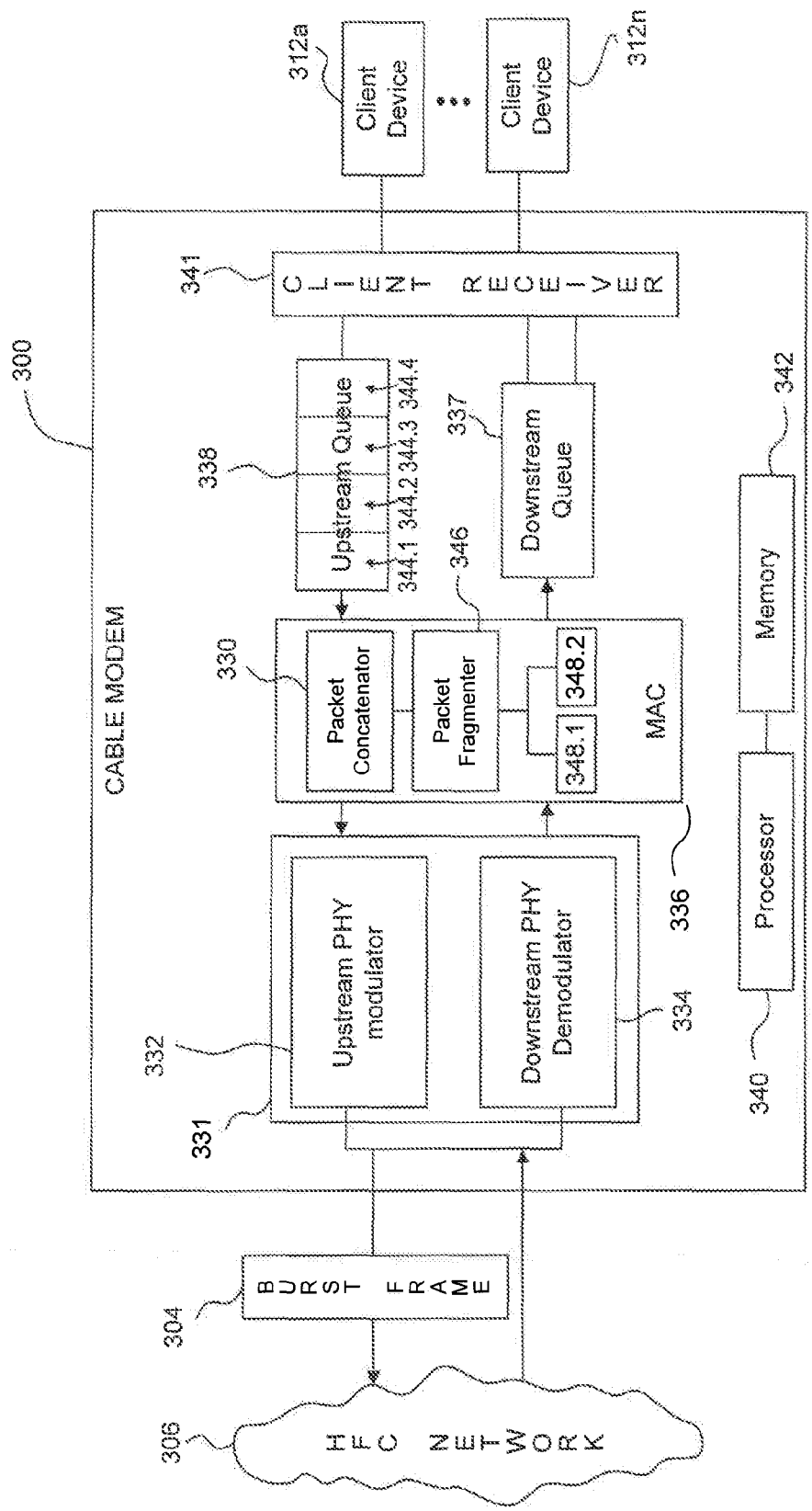
FIG. 3 is a block diagram of a cable modem 300, according to an exemplary embodiment.

FIG. 3 is a block diagram of a cable modem 300, according to an exemplary embodiment. Cable modem 300 may be coupled to one or more client devices 312a-n via client receiver 341. A client device 312 may be any computational device that is coupled to cable modem 300 for communication via client receiver 341 including, but not limited to, for example, storage devices such as Universal Serial Bus (USB) drives, hard disk drives, flash memory drives, optical drives such as CD ROMs and DVD ROMs, WiFi devices such as wireless phones or Voice over Internet Protocol (VoIP) phones, devices that may utilize LAN ports such as video game systems and wireless devices such as personal digital assistants (PDAs), mobile phones, wired or wireless table devices, set-top boxes, and other networking devices, such as switches, hubs, or routers. In the present example, data or traffic received by a cable modem 300 from HFC network 306 (which includes data coming from, for example, CMTS 102 of FIG. 1 and the Internet) is referred to as Wide Area Network (WAN) traffic herein. The data communicated amongst client devices 312a-n via client receiver 341 is referred to as Local Area Network (LAN) traffic herein. In an example, physical layer (PHY) 331 forms the physical layer interface for WAN traffic as well as LAN traffic.

Cable modem 300 may include a physical layer (PHY) 331 that includes an upstream physical layer modulator (US PHY) 332 and a downstream physical layer demodulator (DS PHY) 334. The US PHY 332 and the DS PHY 334 are coupled to MAC 336. MAC 336 is coupled to upstream queue 338 and downstream queue 337. Upstream queue 338 includes one or more queues for storing packets for upstream transmission to a CMTS, such as CMTS 102 of FIG. 1. For example, upstream queue 338 may include packets 344.1-344.4. However, a person of skill in the art would recognize, that upstream queue 338 may include any number of packets. Furthermore, each of the packets 344.1-344.4 may be of any size, for example 512 bytes. When cable modem 300 has reached its transmit time, one or more of the packets 344.1-344.4 may be placed in a burst frame 304 for transmission over HFC network 306. Downstream queue 337 includes one or more queues for storing data for downstream transmission to client devices 312a-n. Cable modem 300 also includes a processor 340 coupled to a memory 342. According an exemplary embodiment, the functions described herein as performed by cable modem 300 may be performed by processor 340 based on instructions stored in memory 342. Cable modem 300 is coupled to HFC network 306 using methods of transmission including but not limited to wired, wireless, or both transmission media, including satellite, terrestrial (e.g., fiber optic, copper, twisted pair, coaxial, hybrid fiber-coaxial (HFC), or the like), radio, microwave, free-space optics, and/or any other form or method of transmission.

Physical layer (PHY) 331 includes US PHY 332 and DS PHY 334. US PHY 332 forms the physical layer interface between a cable modem 300 and the upstream channels of HFC network 306, such as upstream channels 146 of FIG. 1. Cable modem 300 may include a separate US PHY 332 for each one of its upstream channels. Video, voice, data and/or control messages that are destined for a CMTS are collected at US PHY 332 and transmitted to the CMTS. Accordingly, US PHY 332 modulates and/or formats the information for upstream transmission to a CMTS, such as CMTS 102 of FIG. 1. In an embodiment, HFC network 306 may be configured for time-based multiplexing, such as TDMA for upstream communications, or SCDMA (Synchronous Code Division Multiple Access) for upstream communications. Accordingly, US PHY 332, may be configured for transmission bursts, such as burst frame 304.

DS PHY 334 forms the physical layer interface between cable modem 300 and the downstream channel(s) of HFC network 306, such as downstream channels 148 of FIG. 1. DS PHY 334 receives and demodulates all bursts from a CMTS, such as CMTS 102 of FIG. 1.

MAC 336 receives the downstream signals from DS PHY 334 and provides the upstream signals to US PHY 132, as appropriate. In an embodiment, MAC 336 may decode control signals from a CMTS and control the timing of upstream communications. MAC 336 operates as the lower sub-layer of the data link layer for cable modem 300. In embodiments, MAC 336 may also support payload header suppression/expansion, and/or error checking for signals transported over the physical layer.

Memory 342 may interact with MAC 336 to store the signals as they are processed by MAC 336. Memory 342 may also store various auxiliary data used to support the processing activities. Such auxiliary data includes security protocols, identifiers, rules, policies etc.

In an embodiment, MAC 336 also includes packet concatenator 330. Packet concatenator 330 may concatenate two or more of packets 344.1-344.4 in upstream queue 338 for transmission in burst frame 304. Packet concatenator may be configured to determine the maximum size of burst frame 304. The amount of data that may be transmitted in a burst frame 304 may depend on a number of factors. In particular, the maximum size of the burst frame is lower of the theoretical maximum size of the channel, limits set at the CMTS, and limits at cable modem 300. For example, if the theoretical maximum for upstream channels in an HFC network is 11,315 bytes, a CMTS is configured for a limit of 4096 bytes, and cable modem 300 is configured for 2048 bytes, then the maximum burst size is 2048 bytes.

Packet concatenator 330 may then determine, based upon the maximum burst frame size, the number of packets in upstream queue 338 that may fit in burst frame 304. For example, in some cases, two or more of packets 344.1-344.4 may be small enough in size such that they each may fit in their entirety in burst frame 304. In such cases, packet concatenator 330 may concatenate them together so that they may be transmitted in burst frame 304. However, as discussed above, in some cases, after concatenation, there may be some unused space in burst frame 304. For example, the maximum burst size of burst frame 304 may be 2048 bytes and packets 344.1-344.4 may each be 512 bytes in size. In such a case, not all of the packets 344.1-344.4 may fit entirely in burst frame 304. However, if for example, only 344.1-344.3 were concatenated and placed in burst frame 304, once the DOCSIS header overhead is taken into account, this may leave 476 bytes of unused space in burst frame 304. Accordingly, cable modem 300 may be configured to make use of this space.

In particular, MAC 336 includes packet fragmenter 346. Packet fragmenter 346 may be configured to fragment a packet into two or more fragments such that one of the fragments may make use of the unused space. For example, packet fragmenter 346 may fragment packet 344.4 into one or more fragments, such as 348.1 and 348.2. Packet fragmenter 346 is configured to fragment any packet within upstream queue 338 into two or more fragments. For example, packet fragmenter 346 may fragment packets using the IP protocol (beyond the DOCSIS layer). However, a person of skill the art would appreciate that fragmentation may occur using other mechanisms. Packet fragmenter 346 may fragment packet 344.4 into fragments 348.1 and 348.2 using IP version four protocol (IPv4) or IP version six protocol (IPv6). Typically, only two fragments, such as fragments 348.1 and 348.2, may be needed because the size of packet 344.4 may be smaller than the burst frame 304. However, in some cases, more than two fragments may be needed, for example when the size of packet 344.4 is larger than burst frame 304. This may occur, for example when jumbo frames are used. Packet fragmenter 346 may also be configured to account for the overhead associated with burst frame 304. For example, packets 344.1-344.4 may each include Ethernet headers. Accordingly, the Ethernet header may be accounted for when calculating each of the sizes of fragments 348.1 and 348.2. For example, if the unused space of burst frame 304 is 476 bytes, the portion of the fragment 348.1 available for data payload may be less, based upon header overhead, such as the Ethernet header and the IP header. Moreover, packet fragmenter 346 may also need to include DOCSIS overhead, such as MAC extended headers 208 of FIG. 2. Accordingly, fragment 348.1 contains the maximum allowed payload from packet 344.4 that may be accommodated by the unused space of burst frame 304. Fragment 348.2 contains the remaining payload from packet 344.4

After fragments 348.1 and 348.2 are created, packet concatenator 330 may be configured to concatenate fragment 348.1 with packets 344.1-344.3 in order to use substantially all of the space of burst frame 304. In some cases, due to limitations within IP fragmentation, fragment 348.1 may not take up all of the unused space. For example, under both IPv4 and IPv6, IP payloads may be split only on eight-byte boundaries. Packets 344.1-344.3 and fragment 348.1 may then be concatenated by packet concatenator 330 into burst frame 304 for transmission. Fragment 348.2 may remain in upstream queue 338 to be transmitted on a future burst opportunity of cable modem 300.

Cable modem 300 may perform the fragmentation independent of the CMTS. In particular, a CMTS may not be aware that fragments 348.1 or 348.2 are IP fragments. Instead, a CMTS may treat fragments 348.1 and 348.2 as typical DOCSIS packets. Accordingly, one advantage of an embodiment of the invention is that cable modem 300 may be compatible with any type of CMTS without the CMTS being made aware of the fragmentation.

Cable modem 300 may also support jumbo frames through the use of packet fragmenter 346. As discussed above, many CMTSs and cable modems do not support jumbo frames. However, in some cases, client devices 312a-n may be configured to transmit jumbo frames to cable modem 300. In such cases, cable modem 300 may be configured to use packet fragmenter 346 to create fragments less than or equal to the standard Ethernet packet size for each of the jumbo frames received from client device 312a-n. For example, if packet 344.4 is a jumbo frame packet, packet fragmenter 346 may be configured to created two or more fragments of packet 344.4 that are less than or equal to 1518 bytes. A CMTS may also receive a jumbo frame intended for cable modem 300 from a remote host. In an exemplary embodiment, the CMTS may include an IP layer fragmenter, such as fragmenter 129. If a jumbo frame is received by the CMTS, the jumbo frame may be fragmented by the fragmenter into two or more fragments that are each less than or equal to the 1518-byte Ethernet frame size. The fragments may then be transmitted from the CMTS to cable modem 300. Cable modem 300 may then be configured reassemble the fragments into the original jumbo frame according to the IP protocol rules, or simply let them pass to the destination client machine for local reassembly.

An Exemplary Method for Maximizing use of a Burst Frame

Figure 4:
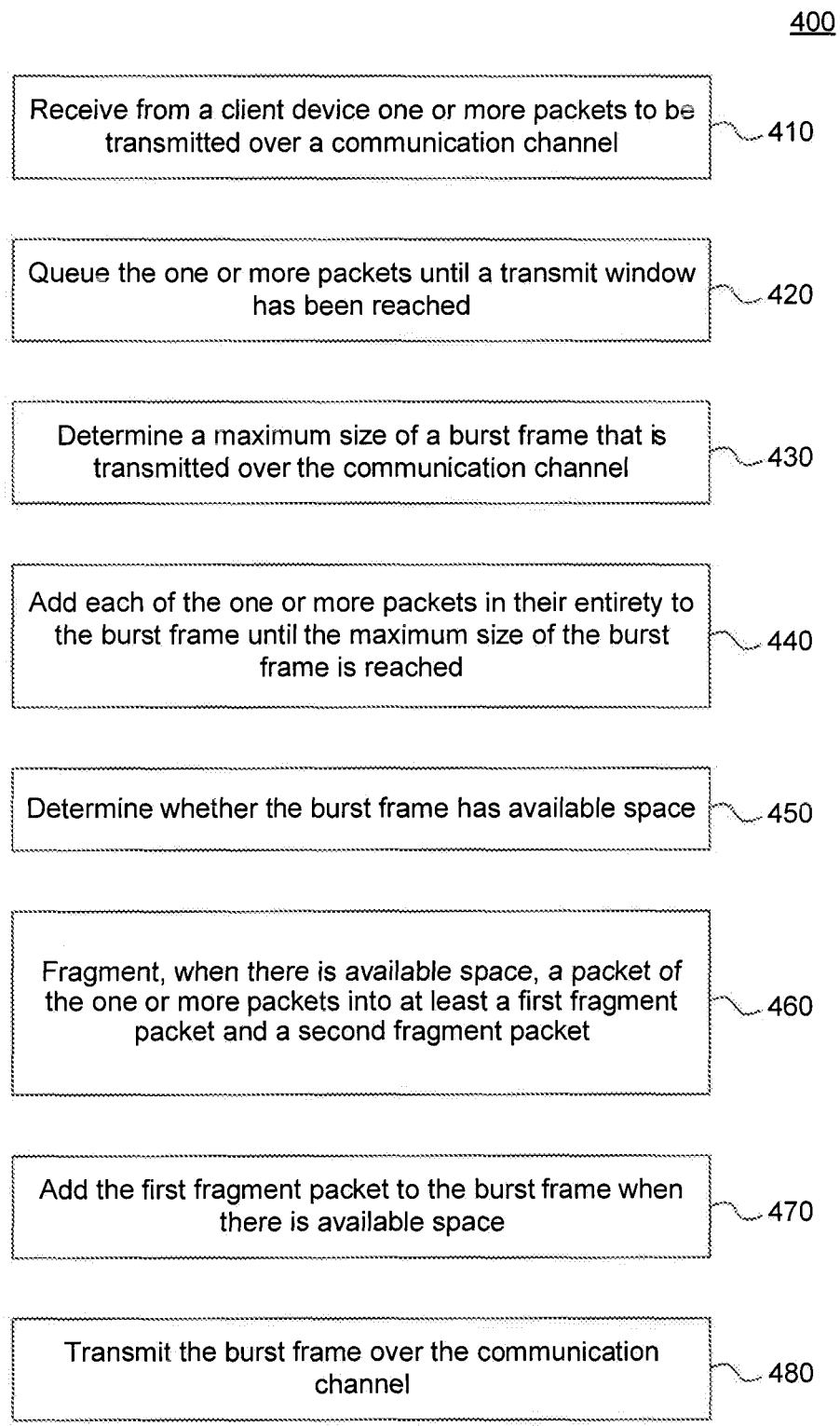
FIG. 4 is flow diagram of a method for maximizing use of a burst frame under DOCSIS, according to an embodiment.

FIG. 4 is flow diagram of a method for maximizing use of a burst frame under DOCSIS.

At block 410 of method 400, one or more packets are received from a client device to be transmitted over a communication channel. The one or more packets may be received by client receiver of a cable modem, such as client receiver 341 of cable modem 300. The client device may be any type of computational device, including but not limited to, a personal computer, mobile device, set-top box, appliance, server, or tablet. The client device may also be a network device, including but not limited to, a router or a switch. The one or more packets may be any of any type of networking communication protocol, for example Ethernet. In an embodiment, the communication channel may implement DOCSIS. In such a case, the one or more packets received by the client device may be converted into packets that may be communicated using DOCSIS. However, the communication channel may be any type of communication channel that utilizes burst frames in upstream communications.

At block 420, the one or more packets are queued. As discussed above, in order to support many cable modems sharing the same communication channel, DOCSIS implements time windows for each cable modem to transmit. In particular, upon request from a cable modem, a CMTS may grant a transmit window for when a particular cable modem may transmit. Accordingly, a cable modem may queue the one or more packets intended to be transmitted over the communication channel until the cable modem's transmit window has been reached.

At block 430, a maximum size is determined of a burst frame that is transmitted over the communication channel. A burst frame is a burst of data that a cable modem transmits data with during the cable modem's transmit window. The maximum size of the burst frame may be determined based upon a number of factors. For example, the modulation scheme used, and the time/ticks assigned to each mini-slot imposes limits on the burst size. The maximum size of the burst frame may also be limited based on configuration settings in the CMTS or cable modem. The particular hardware of a cable modem may also impose limits on the size of the burst. For example, the size of memory or speed of processor in the cable modem may limit the maximum size of the burst frame. Accordingly, the maximum size of the burst frame may be determined by the lower of the theoretical maximum size of the channel, limits set at CMTS, and limits at cable modem. For example, if the theoretical maximum for the communication channel is 11,315 bytes, the CMTS is configured for a limit of 4096 bytes, and the cable modems are configured for 2048 bytes, then the maximum burst size is 2048 bytes.

Many cable modems and CMTSs do not support jumbo Ethernet frames. In particular, the DOCSIS protocol does not provide support jumbo Ethernet frames. As a result, if a client sends a jumbo Ethernet frame to a cable modem, the cable modem is often configured to drop the frame. In an embodiment, support for jumbo Ethernet frames may be provided even though DOCSIS does not support it. In particular, if any of the one or more packets are a jumbo frame, the packet may be fragmented at the network layer so that the packet is less than or equal to a standard Ethernet frame. For example, if a packet is 2000 bytes, the packet may be fragmented into a first packet of 1518 bytes and second packet of 482 bytes. As a result of the fragmentation, the packet may be sent to the CMTS using DOCSIS, and without any modification to the CMTS, the CMTS may treat each of the fragments as a normal Ethernet frame, even though the fragments were originally part of a packet that was originally a jumbo Ethernet frame. In an exemplary embodiment, the CMTS may also be configured to reassemble the jumbo frame fragments internally before sending them out the destination client through the Internet. In the downstream direction, a jumbo frame may be sent from the CMTS to the cable modem using IP layer fragmentation. In particular, the CMTS may be configured to fragment the packet into two or more fragments, such that each fragment is less than or equal to the standard Ethernet frame size. The fragments may then be reassembled at the cable modem using IP protocol rules, or passed along to the destination client for reassembly.

At block 440, each of the one or more packets are added in their entirety to the burst frame until the maximum size of the burst frame is reached. In particular, the one or more packets are added to the burst frame until either the maximum size of the burst frame is reached or until a packet of the one or more packets cannot fit in its entirety in the burst frame. For example, if each of the one or more packets are 512 bytes and the maximum burst size is 2048 bytes, the first three packets may be added into the burst frame in their entirety, but the last packet would not fit in its entirety. In an embodiment, the packets are added to the burst frame by being concatenated together by a packet concatenator into a concatenated packet, such as packet concatenator 330 of FIG. 3. The concatenated packet is then transmitted over the communication channel in the burst frame.

At block 450, it is determined whether the burst frame has available space. At block 440, one or more of the packets may have been added in their entirety to the burst frame. However, this may leave unused space in the burst frame. For example, if each of the one or more packets are 512 bytes and the maximum burst size is 2048 bytes, the first three packets may be added into the burst frame, but the last packet would not fit in its entirety. In order to calculate the amount of available space, however, the overhead of the burst frame may need to be taken into account. For example, MAC extended headers, such as MAC extended headers 208 of FIG. 2 and a concatenation header, such as concatenation header 206 of FIG. 2 may need to be accounted for. Each packet within the burst frame may need a MAC extended header and the burst frame may need a concatenation header. After the overhead of the burst frame is accounted for, the available space in the burst frame may be determined based upon the remaining space in the burst frame.

At block 460, when there is available space, a packet of the one or more packets is fragmented into at least a first fragment packet and a second fragment packet. In particular, a packet fragmenter, such as packet fragmenter 346 of FIG. 3, may fragment a packet of the one or more packets into one or more fragment packets. The packet may be fragmented at the network layer, for example using the IP protocol. However, a person of skill in the art would recognize, that fragmentation may occur using other protocols or at other layers. Typically, only two fragment packets may be needed because the size of packet may be smaller than the burst frame. However, in some cases, more than two fragment packets may be needed, for example when the size of packet is larger than burst frame. This may occur, for example when jumbo frames are used.

In an embodiment, the first fragment packet has a size substantially equal to the available space. The exact size of the first fragment packet may depend on the specifics of the fragmentation. For example, IP fragmentation may cause the first packet fragment to be slightly less than the available space. In particular, IP packets may only have their payloads split on eight-byte boundaries. If the available space for IP payload is not on an eight-byte boundary, the first fragment may end up being slightly smaller than the available space in order to maintain its payload on an eight-byte boundary. A packet within the burst frame may also include other overhead, such as an Ethernet header. In order to properly create the fragments of the packet, the Ethernet header may need to be accounted for. For example, if the available space in the burst frame is 466 bytes, the portion of the fragment available for data payload may be less, based upon header overhead, such as the Ethernet header and the IP header. Accordingly, first fragment contains the maximum allowed payload from the packet that may be accommodated by the available space of the burst frame and the IP protocol.

At block 470, the first fragment may be added to the burst frame when there is available space. In an embodiment, the first fragment may be concatenated with the each of the one or more packets that have been already added into the burst frame. A concatenation header may also be added and configured in order for a CMTS to decode each of the packets in the burst frame and the fragment. Once the fragment has been concatenated with the rest of the packets, the burst frame may be substantially filled with data.

At block 480, the burst frame is transmitted over the communication channel during a transmit window. After the burst frame has been created by concatenating as many of the one or more packets that may fit entirely in the burst frame and then, if needed, also creating and concatenating a fragment, the burst frame may be transmitted over the communication channel. However, in some cases, the burst frame may not be transmitted until its transmit window has arrived and then be sent by the cable modem over the communication channel. During transmission, the burst frame may be modulated, by an upstream PHY modulator, such as upstream PHY modulator 332, of FIG. 3. The second fragment may then be transmitted upon the next transmit window for the cable modem. In an exemplary embodiment, the fragments may be transmitted to their intended destination in fragment form. In such a case, the fragments are reassembled using the IP protocol rules at the end destination. However, according to an exemplary embodiment, the CMTS may be configured to reassemble the fragments prior to transmitting them to their intended end destination. In such a case, the CMTS may transmit the reassembled packet instead of the fragments to the end destination such that no reassembly is required at the end destination.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A method for maximizing the use of frame bursts in a cable modem comprising:
   receiving from a client device one or more packets having a first communication protocol, to be transmitted over a communication channel using a second communication protocol;
   queuing the one or more packets;
   determining a maximum size of a burst frame that is transmitted over the communication channel;
   adding each of the one or more packets in their entirety to the burst frame until the maximum size of the burst frame is reached;
   determining whether the burst frame has available space;
   fragmenting using the first communication protocol, when there is available space, a packet of the one or more packets into at least a first fragment packet and a second fragment packet, wherein the first fragment packet has a size substantially equal to the available space of the burst frame;
   adding the first fragment packet to the burst frame when there is available space; and
   transmitting the burst frame over the communication channel using the second communication protocol during a transmit window.

2. The method of claim 1, wherein the second communication protocol comprises Data Over Cable Service Interface Specification (DOCSIS).

3. The method of claim 1, wherein the transmitting further comprises:
   transmitting the at least first fragment packet and second fragment packet, wherein the at least first fragment packet and second fragment packet remain unassembled until they reach their destination.

4. The method of claim 3, wherein the first communication protocol comprises Internet Protocol version 4 (IPv4).

5. The method of claim 3, wherein the first communication protocol comprises Internet Protocol version 6 (IPv6).

6. The method of claim 1, further comprising:
   receiving at least the first fragment packet and the second fragment packet at a cable modem termination system (CMTS);
   reassembling at least the first fragment packet and the second fragment packet into a reassembled packet; and
   transmitting the reassembled packet from the CMTS.

7. The method of claim 1, wherein determining whether the burst frame has available space includes:
   determining a burst frame overhead; and
   subtracting the burst frame overhead from the maximum size of the burst frame.

8. The method of claim 1, wherein the one or more packets include a jumbo Ethernet frame, and
   wherein the fragmenting further comprises fragmenting the jumbo Ethernet frame into a plurality of fragment packets, wherein each of the plurality of fragment packets has a size that is less than or equal to a predetermined threshold.

9. The method of claim 8, wherein the predetermined threshold is an Ethernet maximum frame size.

10. The method of claim 8, wherein fragmenting the jumbo Ethernet frame into the plurality of fragments comprises:
    fragmenting using Internet protocol (IP) protocol the jumbo Ethernet frame into a plurality of packet fragments.

11. A cable modem for maximizing the use of frame bursts comprising:
    a processor;
    a memory;
    a client receiver configured to receive one or more packets having a first communication protocol from a client device;
    an upstream queue configured to enqueue each of the one or more packets;
    a packet concatenator configured to determine whether a burst frame has available space;
    a packet fragmenter configured to:
      fragment using the first communication protocol, when there is available space, a packet of the one or more packets into at least a first fragment packet and a second fragment packet, wherein the first fragment has a size substantially equal to the available space of the burst frame, and
      add the first fragment to the burst frame when there is available space; and
    an upstream modulator configured to modulate the burst frame and transmit the burst frame over a communication channel during a transmit window using a second communication protocol.

12. The cable modem of claim 11, wherein the second communication protocol comprises Data Over Cable Service Interface Specification (DOCSIS).

13. The cable modem of claim 11, wherein the upstream modulator is further configured to:
    transmit the at least first fragment packet and second fragment packet, wherein the at least first fragment packet and second fragment packet remain unassembled until they reach their destination.

14. The cable modem of claim 11, wherein the first communication protocol comprises Internet Protocol version 4 (IPv4).

15. The cable modem of claim 11, wherein the first communication protocol comprises Internet Protocol version 6 (IPv6).

16. The cable modem of claim 11, wherein the packet concatenator is further configured to:
    determine the burst frame overhead; and
    subtract the burst frame overhead from a maximum size of the burst frame.

17. The cable modem of claim 11, wherein the one or more packets include a jumbo Ethernet frame, and wherein the packet fragmenter is further configured to:
    fragment the jumbo Ethernet frame into a plurality of fragment packets, wherein each of the plurality of fragment packets has a size that is less than or equal to a predetermined threshold.

18. The cable modem of claim 17, wherein the predetermined threshold is an Ethernet maximum frame size.

19. A cable modem termination system (CMTS) for maximizing the use of burst frames comprising:
    a processor;
    a memory;
    a receiver configured to receive a jumbo Ethernet frame having a first communication protocol from a remote host;
    a packet fragmenter configured to fragment the jumbo Ethernet frame into two or more fragments using the first communication protocol, wherein each of the fragments has a size less than or equal to a predetermined threshold; and a downstream modulator configured to modulate each of the fragments and transmit each of the fragments to a cable modem using a second communication protocol.

20. The CMTS of claim 19, further comprising:

a media access control layer configured to receive one or more fragments from a cable modem, wherein the one or more fragments form a packet; and a packet reassembler configured to reassemble the one or more packets into the packet.

* * * * *